(12) United States Patent
Mercier et al.

(10) Patent No.: US 11,386,716 B2
(45) Date of Patent: Jul. 12, 2022

(54) BIOMETRIC RECOGNITION METHOD WITH DRIFT CONTROL, AND AN ASSOCIATED INSTALLATION

(71) Applicant: IDEMIA IDENTITY & SECURITY FRANCE, Courbevoie (FR)

(72) Inventors: Laurent Mercier, Courbevoie (FR); Stéphane Gentric, Courbevoie (FR); Aurélien Fenals, Courbevoie (FR); Olivier Heurtier, Courbevoie (FR); Laurent Kerautret, Courbevoie (FR)

(73) Assignee: IDEMTA IDENTITY & SECURITY FRANCE, Courbevoie (FR)

( * ) Notice: Subject to any disclaimer, the term of this patent is extended or adjusted under 35 U.S.C. 154(b) by 92 days.

(21) Appl. No.: 16/998,710

(22) Filed: Aug. 20, 2020

(65) Prior Publication Data

US 2021/0056334 A1    Feb. 25, 2021

(30) Foreign Application Priority Data

Aug. 21, 2019  (FR) ...................................... 1909313

(51) Int. Cl.
*G06K 9/62*    (2022.01)
*G06V 40/50*   (2022.01)
(Continued)

(52) U.S. Cl.
CPC .............. *G06V 40/50* (2022.01); *G06F 21/32* (2013.01); *G06K 9/6215* (2013.01);
(Continued)

(58) Field of Classification Search
CPC .. G06K 9/6256–9/6259; G06V 40/172; G06V 40/16–40/179; G06V 10/82;
(Continued)

(56) References Cited

U.S. PATENT DOCUMENTS

2020/0110968 A1* 4/2020 Onodera ................. G10L 17/10
2020/0410266 A1* 12/2020 Luo ...................... G06K 9/00926

FOREIGN PATENT DOCUMENTS

WO    WO2019/002602 A1    1/2019

OTHER PUBLICATIONS

A. Bharati, R. Singh, M. Vatsa and K. W. Bowyer, "Detecting Facial Retouching Using Supervised Deep Learning," in IEEE Transactions on Information Forensics and Security, Sep. 1, 2016, pp. 1903-1913 vol. 11, No. 9.

(Continued)

*Primary Examiner* — Brian Werner
(74) *Attorney, Agent, or Firm* — Muncy, Geissler, Olds & Lowe, P.C.

(57) ABSTRACT

The invention relates to a method of biometric recognition by means of an artificial intelligence unit (5) that has access to a memory (3) containing at least one reference image of a body portion of a user and that is arranged to compare it with at least one image that has been captured of the same body portion of a candidate for recognition, the method comprising the step of submitting training images to the artificial intelligence unit, the training images presenting body portions similar to those of the reference image, the artificial intelligence unit being taught to reject them, and the method comprising the additional step of submitting at least one anti-drift image to the artificial intelligence unit, the artificial intelligence unit being taught to accept it. The invention also relates to an associated installation.

16 Claims, 3 Drawing Sheets

(51) Int. Cl.
G06T 7/155 (2017.01)
G06F 21/32 (2013.01)
G06V 40/16 (2022.01)

(52) U.S. Cl.
CPC ............ G06K 9/6256 (2013.01); G06T 7/155 (2017.01); G06V 40/172 (2022.01); *G06T 2207/20036* (2013.01); *G06T 2207/20081* (2013.01)

(58) Field of Classification Search
CPC ........... G06F 21/32; G06T 2207/20081; G06T 2207/20084; G06T 3/4046; G06T 9/002; G06N 3/02–3/105; G06N 20/00–20/20
See application file for complete search history.

(56) References Cited

OTHER PUBLICATIONS

T. Neubert, A. Makrushin, M. Hildebrandt, C. Kraetzer and J. Dittmann, "Extended StirTrace benchmarking of biometric and forensic qualities of morphed face images," in IET Biometrics, Jul. 1, 2018, pp. 325-332, vol. 7, No. 4.

\* cited by examiner

[Fig. 1]
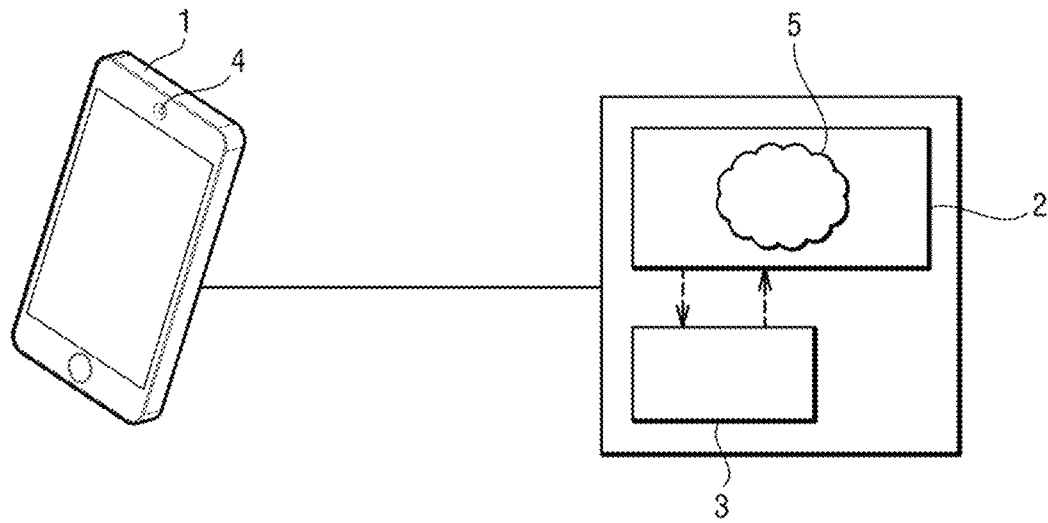
[Fig. 2a]
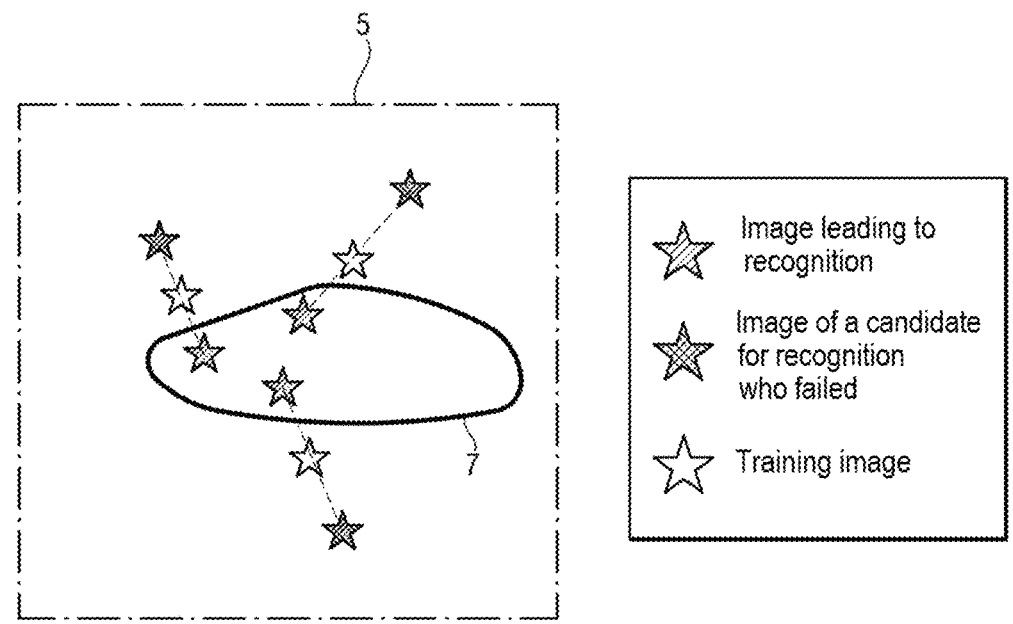

[Fig. 2b]
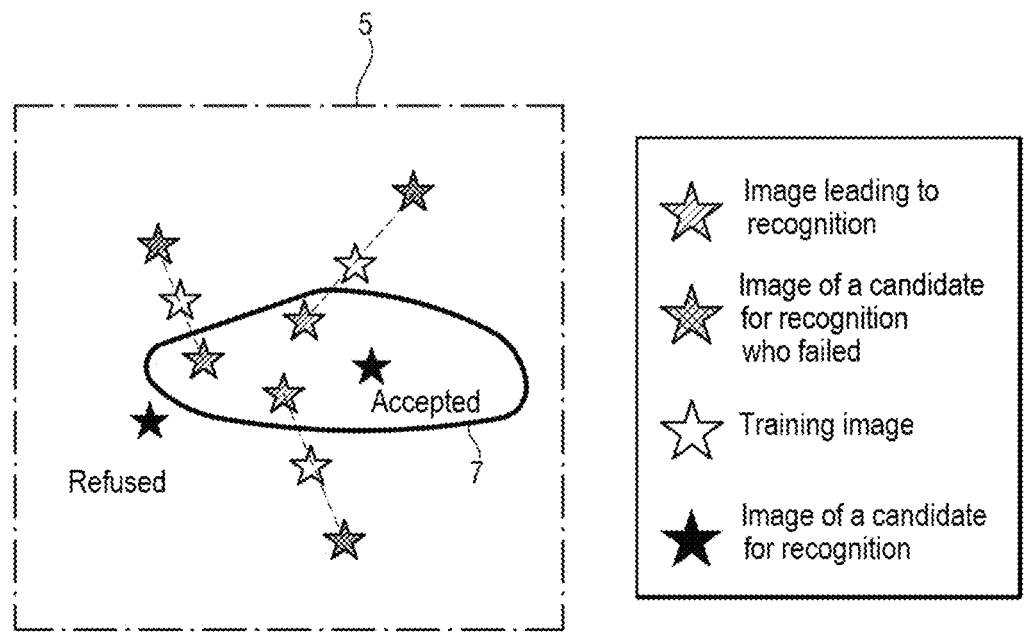
[Fig. 2c]
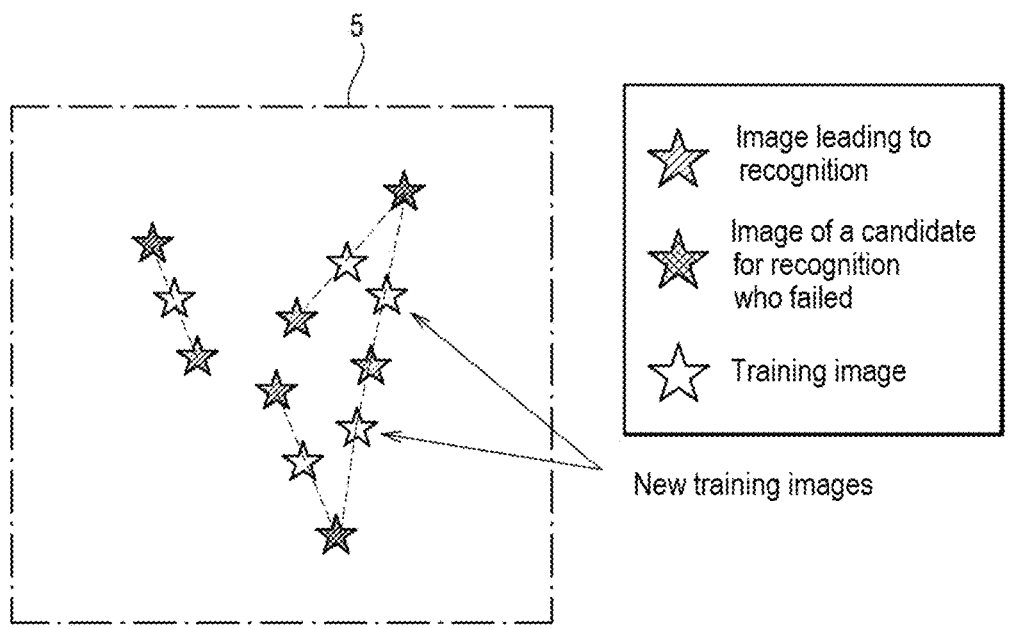

[Fig. 2d]
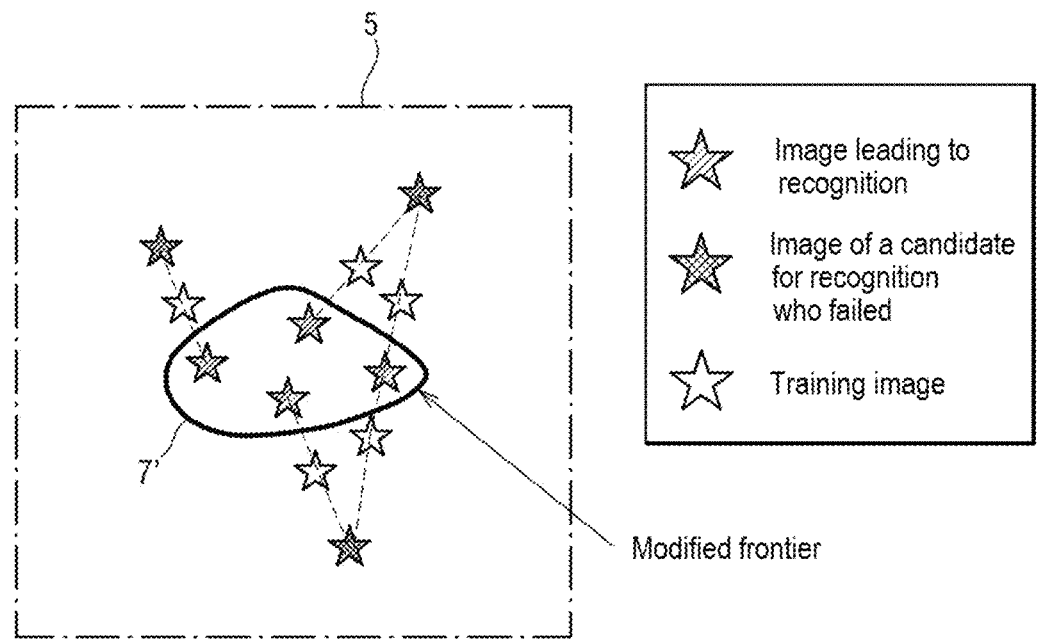

BIOMETRIC RECOGNITION METHOD WITH DRIFT CONTROL, AND AN ASSOCIATED INSTALLATION

The present invention relates to the field of biometric recognition, e.g. for the purposes of identifying an individual or of verifying that an individual is entitled to access premises, an object, or information.

BACKGROUND OF THE INVENTION

Usually, in order to validate or refuse recognition, a biometric recognition method consists in comparing biometric data extracted from an image that has been captured of a portion of the body of a candidate for recognition with reference biometric data extracted from a reference image of the same portion of a user's body.

However, nowadays the field of biometric recognition needs to confront a new fraud technique known as "morphing". Morphing consists in creating a fraudulent image by combining an image of a portion of a user's body with an image of the same portion of another person's body, the fraudulent image thus appearing to be similar to both of the images from which it is derived and consequently being capable of fooling the device that performs the biometric recognition method.

OBJECT OF THE INVENTION

An object of the invention is to provide a method that enables biometric recognition to withstand that type of fraud better.

Another object of the invention is to propose an installation enabling such a method to be performed.

SUMMARY OF THE INVENTION

In order to achieve this object, the invention provides a method of biometric recognition by means of an artificial intelligence unit that has access to a memory containing reference biometric data extracted from at least one reference image of a body portion of a user and that is arranged to compare, with the reference biometric data, biometric data extracted from at least one image that has been captured of the same body portion of a candidate for recognition;

the method comprising the step of acting regularly and voluntarily to submit training images to the artificial intelligence unit, the training images presenting body portions similar to those of the reference image, the artificial intelligence unit being taught to reject them; and the method comprising the additional step of acting regularly and voluntarily to submit at least one anti-drift image to the artificial intelligence unit, the artificial intelligence unit being taught to accept it, thereby serving to limit any risk of the artificial intelligence unit drifting;

the at least one anti-drift image being submitted to the artificial intelligence unit at a rate that is less than the rate at which the training images are submitted.

Thus, with the invention, the artificial intelligence unit is subjected to machine learning that serves to strengthen its recognition of the user by voluntarily presenting it with training images that, however, are not images of the user. Consequently, the artificial intelligence unit becomes more accurate and better at withstanding frauds such as morphing frauds.

This machine learning is also checked by regularly presenting it with the at least one anti-drift image in order to avoid the artificial intelligence unit drifting.

Advantageously, the invention can also lead to a better understanding of how morphing type frauds can operate by observing the machine learning of the artificial intelligence unit.

In the meaning of the present invention, the term "training images" is used for images that are related to the at least one reference image, but that are not the at least one reference image. In nonlimiting manner, such training images may thus be:

images fabricated from the at least one reference image (typically by morphing, using the synthetic approach to create a synthetic image, or by any other image modification technique); and/or fabricated or real images that share one or more characteristics with the at least one reference image (e.g. the same eye color, the presence of a birthmark on the face or the hand, . . . ); and/or images of previous candidates for recognition who have failed but whose images present high similarity scores relative to the at least one reference image (where the concept of a high similarity score may for example be defined by a predetermined threshold value); and/or images fabricated from images of previous candidates for recognition who have failed but whose images present high similarity scores relative to the at least one reference image (where the concept of a high similarity score may be defined for example by a predetermined threshold value);

etc.

In the meaning of the present invention, the term "voluntarily" means that the images that are presented voluntarily to the artificial intelligence unit are presented solely for the purpose of machine learning by the artificial intelligence unit and not to satisfy a genuine request for recognition by the user or by any other person.

The term "anti-drift image" means the at least one reference image and/or an image that has authorized authentication with a high similarity score relative to the at least one reference image (where the concept of a high similarity score may be defined for example by a predetermined threshold value).

Optionally, at least one anti-drift image is the at least one reference image.

Optionally, at least one training image is an image fabricated from the at least one reference image.

Optionally, the training image is fabricated by morphing the at least one reference image with at least one other image.

Optionally, the at least one other image is an image extracted from a database and including at least one characteristic in common with the at least one reference image and/or an image of a previous candidate for recognition for whom recognition was refused.

Optionally, a plurality of training images are fabricated from the at least one reference image and from a single other image, the training images having increasing density of content from the at least one reference image.

Optionally, at least one training image is a fabricated or real image that shares one or more characteristics with the at least one reference image.

Optionally, at least one training image is an image related to an image of a previous candidate for recognition who failed, but whose image presents a high similarity score relative to the at least one reference image.

Optionally, the method further comprises the step of acting regularly and voluntarily to submit to the artificial intelligence unit at least one previously-captured image that has led to recognition, said image not being the reference image. This image may be an anti-drift image or some other image depending on its similarity with the at least one reference image.

Optionally, in order to validate or refuse recognition, the method also relies on the location and/or the time at which an image of a candidate for recognition was captured.

Optionally, the biometric data is facial biometric data.

Optionally, the reference image is a three-dimensional image.

The invention also provides an installation including at least one artificial intelligence unit for performing the method as specified above.

Optionally, the installation includes at least one memory to which the artificial intelligence unit has access.

Optionally, the installation is a mobile telephone.

Optionally, the biometric recognition method is configured to authorize unlocking of the mobile telephone in the event of recognition.

Other characteristics and advantages of the invention appear on reading the following description of a particular, nonlimiting implementation of the invention.

BRIEF DESCRIPTION OF THE DRAWINGS

The invention can be better understood in the light of the following description given with reference to the accompanying figures, in which:

FIG. 1 is a diagram showing an installation for performing the invention;

FIG. 2a is a diagram representing a first machine learning step of an artificial intelligence unit of the installation shown in FIG. 1;

FIG. 2b is a diagram representing a second machine learning step of an artificial intelligence unit of the installation shown in FIG. 1;

FIG. 2c is a diagram representing a third machine learning step of an artificial intelligence unit of the installation shown in FIG. 1; and FIG. 2d is a diagram representing a fourth machine learning step of an artificial intelligence unit of the installation shown in FIG. 1.

DETAILED DESCRIPTION OF THE INVENTION

In the implementation described below, the invention is applied to unlocking a user's mobile telephone 1 by facial recognition.

By way of example, the mobile telephone 1 may be of the smartphone type. The mobile telephone 1 includes a processor 2, a memory 3 containing programs, and at least one image sensor 4. The processor 1 contains an artificial intelligence unit 5 that has access to the memory 3. More precisely, the artificial intelligence unit 5 is a computer program, itself known, that has been configured to perform the invention. The memory 3 also contains a facial recognition computer program that comprises instructions arranged to enable the processor 2 to perform the method of the invention, in particular by calling on the artificial intelligence unit 5.

The facial recognition method comprises the initial steps of:
capturing a "reference" image of a portion of the user's body;
extracting "reference" biometric data from this image; and
storing said reference biometric data in order to enable subsequent facial recognition of the user.

In order to capture the image, the processor 2 controls the image sensor 4 of the mobile telephone 1 and requests the user to take a photograph of the user's own face (commonly known as a "selfie"). For this purpose, the processor 2 can display textual or graphics instructions enabling the user to take a photograph of quality that is sufficient (in terms of exposure, sharpness, image contrast, dimensions, and position of the face in the image, . . . ) to enable biometric data to be extracted.

The reference image may equally well be in two dimensions or in three dimensions. For a three-dimensional image, the image sensor 4 preferably includes an infrared camera that projects a matrix on the user's face in order to take a high-quality reference image in three dimensions.

The processor 2 is arranged to detect the position of the face in the image, to align the face in the image, and then to extract biometric data. Detecting the position of the face and aligning the face, make it possible to obtain an image of predetermined dimensions cropped to match the face: these operations are themselves known and they are not described in greater detail herein.

More specifically, the extraction is performed by the artificial intelligence unit 5 trained by machine learning. For this purpose, the artificial intelligence unit 5 includes a neural network. In this example, only one neural network is used, however it is possible to use a plurality of neural networks for performing the extraction.

The reference biometric data as extracted in this way is stored in the memory 3.

By way of example, these initial steps may be performed when the mobile telephone 1 is put into operation, or they may be performed subsequently. The processor 2 may be configured to act at regular intervals to propose changing the user's reference image, and/or the mobile telephone 1 may be configured to authorize the user to access an application, stored in the memory 3, for the purpose of voluntarily changing the user's reference image.

Once the mobile telephone 1 is operational, when a person seeks to access the content of the mobile telephone 1, e.g. by pressing on the touchscreen or on a button, the processor 2 launches the following steps of the facial recognition method:
capturing an image of a portion of the body of a candidate for recognition;
extracting biometric data of the candidate from the image;
comparing the candidate's biometric data with the reference biometric data and deducing a corresponding similarity score therefrom;
validating or refusing recognition as a function of the value of the similarity score compared with a threshold value that is predetermined (e.g. by the manufacturer of the mobile telephone 1); and
unlocking if recognition is validated and optionally issuing a warning if recognition is refused.

At least the steps of extraction, of comparison, and of calculating the similarity score are performed by the artificial intelligence unit 5.

As mentioned above, the artificial intelligence unit 5 is trained by machine learning.

In a particular implementation of the invention, the machine learning makes use of one, all, or some of the successful recognitions for training the artificial intelligence unit 5. For this purpose, at least one captured image that has led to recognition is stored in the memory 3 in order to be available for subsequent reuse in training the artificial intelligence unit 5.

Typically, the machine learning includes the following steps:
- recovering from the memory 3 a captured image that has led to recognition; and
- presenting said image to the artificial intelligence unit 5 while specifying that it is to accept recognition and unlock the mobile telephone 1.

With a mobile telephone 1, several tens of images that have led to recognition can thus be stored each day and used for training the artificial intelligence unit 5. Machine learning thus trains the artificial intelligence unit 5 to recognize the user in spite of the user ageing relative to the reference image or in spite of the images being captured under differing conditions (lighting, weather, surroundings, . . . ). As a result, the artificial intelligence unit 5 becomes more accurate.

In addition to the artificial intelligence unit 5 performing machine learning on the basis of recognitions that are successful, the machine learning is also configured to train the artificial intelligence unit 5 on the basis of recognitions that have been refused.

For this purpose, the machine learning includes the step of acting regularly and voluntarily to submit training images to the artificial intelligence unit 5, which training images present faces that are similar to the reference image, and are submitted in order to teach the artificial intelligence unit 5 to reject them.

Typically, the machine learning includes the following steps:
- preparing at least one training image;
- presenting the training image to the artificial intelligence unit 5 while specifying that it is to refuse recognition and not unlock the mobile telephone 1.

The accuracy of the artificial intelligence unit 5 is thus increased by training it not to unlock the mobile telephone 1 in spite of being presented with a face similar to the user's face.

As mentioned above, the processor 2 executes a program comprising instructions for preparing training images for use by the artificial intelligence unit 5.

Various options can then be envisaged, with each option being combinable with one or more or all of the options listed below, this list not being exhaustive.

In a first option, the program fabricates at least one training image from the reference image. Typically, the program uses the morphing technique to obtain a training image by combining the reference image with another image (an image that shares one or more characteristics with the reference image (e.g. thick eyebrows, the presence of a birthmark, . . . ), the image of a previous candidate for recognition for whom authentication was refused . . . ). By way of example, starting from the reference image and from a single other image, it is possible to fabricate a plurality of training images with increasing density of content from the reference image being present in the various images that are obtained by morphing.

In a second option, the program selects at least one training image as an image that shares one or more characteristics with the reference image (e.g. thick eyebrows, the presence of a birthmark, . . . ).

In a third option, the program selects at least one training image as the image of a previous candidate for recognition for whom authentication was refused, but whose image presented a calculated similarity score greater than a given predetermined threshold.

In a fourth option, the program fabricates at least one training image from at least one image that shares one or more characteristics with the reference image (e.g. thick eyebrows, the presence of a birthmark, . . . ) and/or from an image of a previous candidate for recognition for whom authentication was refused, but whose image presented a calculated similarity score greater than a given predetermined threshold. By way of example, the program uses the morphing technique to obtain a training image by combining two images that share one or more characteristics with the reference image and/or by combining an image that shares one or more characteristics with the reference image with an image of a previous candidate for recognition for whom authentication was refused, but whose image presented a calculated similarity score greater than a given predetermined threshold and/or by combining two images of previous candidates for recognition for whom authentications were refused, but whose image presented calculated similarity scores greater than a given predetermined threshold.

By way of example, the image that shares one or more characteristics with the reference image may be taken from a database.

It should be observed that depending on the target training, it is thus appropriate to store in the memory at least one image of a previous candidate for recognition for whom authentication was refused (one, some, or all of the images of previous candidates who have failed; one, some, or all of the images of previous candidates who have failed, but whose images present a similarity score with the reference image that exceeds a given threshold) and/or to arrange the mobile telephone 1 so that the program executed by the processor 2 can have access to a database, e.g. hosted on a remote computer server and connected to the mobile telephone 1 by a data transport network such as the Internet when the mobile telephone 1 connects to the network and/or to store a database directly in the memory 3 (optionally updated when the mobile telephone 1 connects to a data transport network such as the Internet).

As a result of the artificial intelligence unit 5 being regularly subjected both to captured images of the user that are substantially different from the reference image (user ageing, differing capture conditions, . . . ), and also to training images that are similar to the reference image, the artificial intelligence unit 5 might drift little by little.

In order to limit this risk, the machine learning includes the additional step of acting regularly and voluntarily to submit at least one anti-drift image to the artificial intelligence unit 5 while specifying that it is to accept recognition and unlock the mobile telephone 1.

Preferably, the anti-drift image is the reference image.

The machine learning thus serves to return to the reference image in regular manner so that the artificial intelligence unit 5 does not forget it.

It should be observed that the artificial intelligence unit 5 has the reference image submitted thereto at a rate that is lower than the rate at which the training images are submitted thereto, and in this example at a rate that is also lower than the rate at which images that have previously led to recognition are submitted thereto.

By way of example, and in nonlimiting manner, the reference image is submitted to the artificial intelligence unit 5 at a rate lying in the range once per day to once per week. By way of example, and in nonlimiting manner, the training images are submitted to the artificial intelligence unit 5 at a rate lying in the range several times per day to several times per hour.

The rates at which the reference image and training images are presented depend in particular on the level of security desired in the installation in order to authorize identification.

In the above-described implementation, the artificial intelligence unit 5 performs machine learning at different levels, thereby enabling the artificial intelligence unit 5 to be trained well and made more accurate. In particular, in order to train the artificial intelligence unit, the machine learning relies on:

successful authentications;
the training images; and
the reference image.

FIGS. 2a to 2d are diagrams illustrating how the artificial intelligence unit might evolve.

With reference to FIG. 2a, the artificial intelligence unit 5 has established a frontier 7 to define a space that contains images that have enabled user recognition to be authorized (i.e. successful authentications). The training images and the previous images of candidates for recognition for whom authentication was refused lie outside this space.

Thus, as can be seen in FIG. 2b, for subsequent authentication requests, authentication is accepted or refused depending on whether the image of a candidate for recognition does or does not lie in the space defined by the frontier 7.

With reference to FIG. 2c, the machine learning is based on the new image that has allowed recognition of the user to be authorized (see FIG. 2c), with this new image being used to generate one or more new training images.

As can be seen in FIG. 2d, this makes it possible to define a new frontier 7' that is more accurate, thereby improving the learning of the artificial intelligence unit 5.

Naturally, the invention is not limited to the implementation described, but covers any variant coming within the ambit of the invention as defined by the claims.

In particular, the method may be performed using an installation other than a mobile telephone, such as for example a security terminal, a computer, a car card, an automated fingerprint identification system (AFIS), . . . . In addition, if a mobile telephone is used, the method may be performed for an action other than unlocking the telephone.

Thus, in general manner, whatever the installation used, the method may be performed so that recognition serves to authorize access to premises, e.g. such as a secure building, a transport transfer zone (dock, boarding gate, etc.) . . . and/or serves to authorize access to an object such as a car, a computer, . . . and/or serves to authorize access to information (e.g. via an Internet site, a particular space, etc.).

Furthermore, although in the above description everything takes place in a single installation, certain steps could be performed by a remote computer server, the installation being in communication with the remote computer server via a data transport network such as a network of Internet, Bluetooth, . . . type. It is also possible to have a memory that is separate from the installation and with which the installation is in (wired or wireless) communication.

For example, the installation may become connected to a remote computer server via a data transport network, such as the Internet. In conventional manner, the computer server comprises a processor and a memory containing programs and a database. In order to train the artificial intelligence unit, the computer server or the installation could execute a program containing instructions for preparing training images from the database for use by the artificial intelligence unit. For example, the program could select, from the database, images that share one or more characteristics with the reference image (e.g. the same eye color, the presence of a birthmark on the face or on the hand, . . . ) and/or could fabricate training images from one or more images in the database.

In general manner, the steps could be performed in an installation that comprises only one device, or that comprises a plurality of distinct devices.

Naturally, the invention is applicable to performing biometrics other than of the face, and for example of fingerprints, irises, . . . .

In order to ensure recognition, the method could rely on data other than the biometric data associated with the reference image, e.g. such as the location and/or the time at which an image is captured of a candidate for recognition (typically relative to previously captured images).

Other information could be included with the reference biometric data, e.g. such as a date, the user's name, or any other string of alphanumeric characters.

Furthermore, although the particular implementation described mentions only one reference image, the invention could be performed using a plurality of reference images. Under all circumstances, it should be understood that the reference image(s) should not be changed frequently and in all likelihood should be conserved for several months at least, or indeed for several consecutive years.

The anti-drift image need not be the reference image, but could be an image that has authorized authentication with a high similarity score relative to the at least one reference image.

When the morphing technique (or any other image-modifying technique) is used for making training images, it is possible to combine more than two images in order to obtain the training image.

The invention claimed is:

1. A method of biometric recognition, comprising:
   comparing, by an artificial intelligence unit, reference biometric data extracted from at least one reference image of a body portion of a user with biometric data extracted from at least one image that has been captured of the same body portion of a candidate for recognition;
   deducing, by the artificial intelligence unit, a similarity score from the comparing;
   validating or refusing recognition as a function of the value of the similarity score compared with a predetermined threshold value;
   performing machine learning of the artificial intelligence unit, wherein said performing step comprises teaching the artificial intelligence unit to reject training images which are regularly and voluntarily submitted to the artificial intelligence unit, the training images presenting body portions similar to those of the reference image; and
   teaching the artificial intelligence unit to accept at least one anti-drift image which is regularly and voluntarily submitted to the artificial intelligence unit, the at least one anti-drift image being submitted to the artificial intelligence unit at a rate that is less than the rate at which the training images are submitted.

2. The method according to claim 1, wherein the anti-drift image is the at least one reference image.

3. The method according to claim 1, wherein at least one training image is an image fabricated from the at least one reference image.

4. The method according to claim 3, wherein the training image is fabricated by morphing the at least one reference image with at least one other image.

5. The method according to claim 4, wherein the at least one other image is an image extracted from a database and including at least one characteristic in common with the at least one reference image and/or an image of a previous candidate for recognition for whom recognition was refused.

6. The method according to claim 4, wherein a plurality of training images are fabricated from the at least one reference image and from a single other image, the training images having increasing density of content from the at least one reference image.

7. The method according to claim 1, wherein at least one training image is a fabricated or real image that shares one or more characteristics with the at least one reference image.

8. The method according to claim 1, wherein at least one training image is an image related to an image of a previous candidate for recognition who failed, but whose image presents a high similarity score relative to the at least one reference image.

9. The method according to claim 1, further comprising the step of acting regularly and voluntarily to submit to the artificial intelligence unit at least one previously-captured image that has led to recognition, said image not being the reference image.

10. The method according to claim 1, wherein, in order to validate or refuse recognition, the method also relies on the location and/or the time at which an image of a candidate for recognition was captured.

11. The method according to claim 1, wherein the biometric data is facial biometric data.

12. The method according to claim 1, wherein the reference image is a three-dimensional image.

13. An installation including at least one artificial intelligence unit configured to perform the method according to claim 1.

14. The installation according to claim 13, including at least one memory to which the artificial intelligence unit has access.

15. The installation according to claim 13, wherein the installation is a mobile telephone.

16. The installation according to claim 15, wherein the biometric recognition method is configured to authorize unlocking of the mobile telephone in the event of recognition.

* * * * *